March 14, 1939.  O. F. BAUER  2,150,313
TOOTH ALIGNING DEVICE
Filed Aug. 25, 1937  3 Sheets-Sheet 2

Oliver F. Bauer Inventor

Attorney

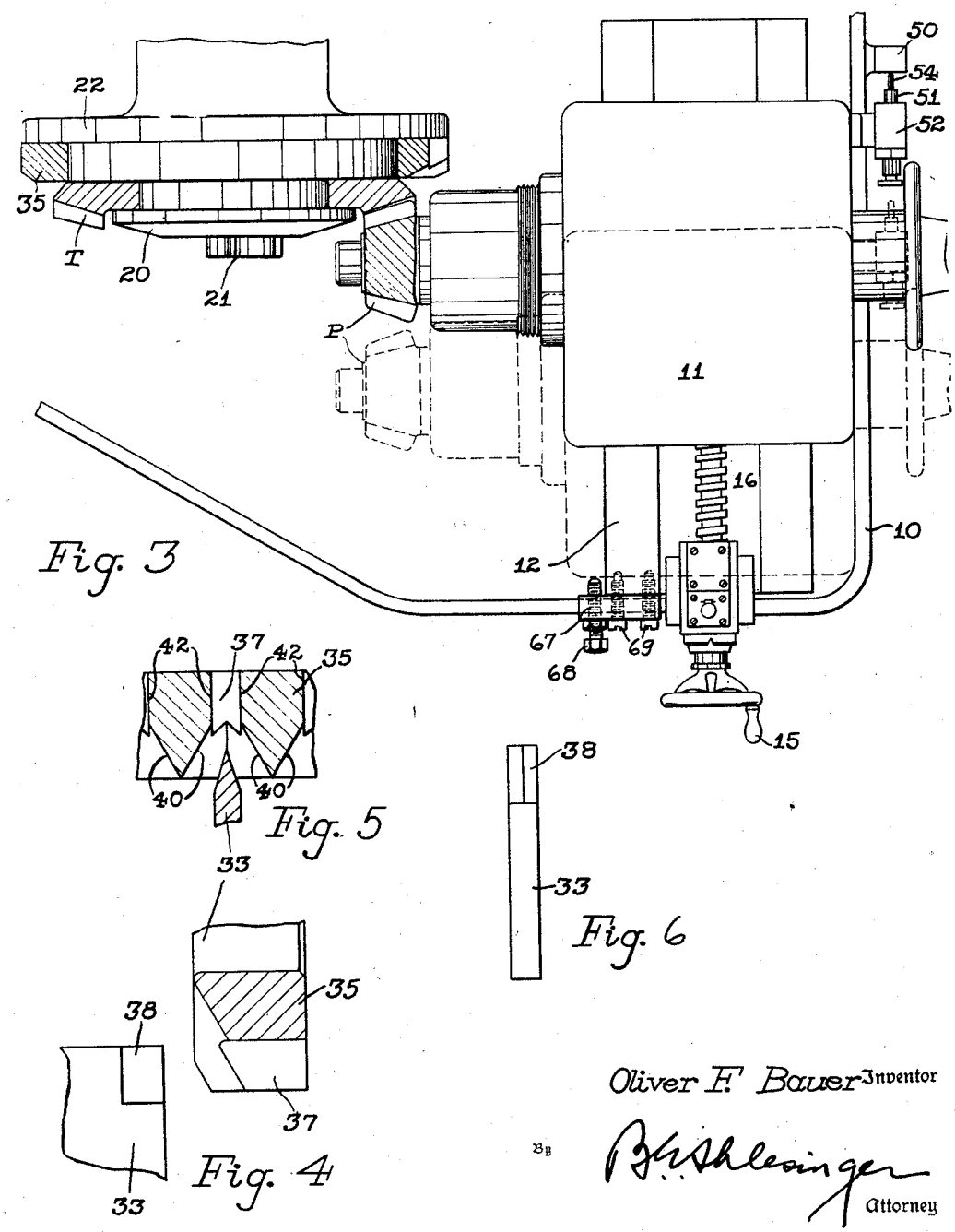

Patented Mar. 14, 1939

2,150,313

UNITED STATES PATENT OFFICE 2,150,313

TOOTH ALIGNING DEVICE

Oliver F. Bauer, Rochester, N. Y., assignor to Gleason Works, Rochester, N. Y., a corporation of New York Application August 25, 1937, Serial No. 160,879

15 Claims. (Cl. 90—2)

The present invention relates to machines for the treatment of gears and particularly to machines for running a pair of gears together or for running a gear with a tool of gear form. The invention especially relates to machines for shaving gears.

In the shaving of gears, a gear that has had its teeth previously cut very closely to finished size, is run with a shaving tool of gear form which has its teeth slotted or grooved to provide cutting edges. The shaving tool, when run with the gear removes the inaccuracies and defects left after the cutting operation and produces a smooth, accurate gear.

Shaving tools are expensive to make and because their teeth are necessarily somewhat weakened by being grooved or slotted, are delicate. Heretofore, considerable difficulty with breakage of such tools has been experienced by reason of careless operators failing to align the teeth of the gear to be shaved with the tooth spaces of the shaving gear before starting up the shaving machine or by placing on the shaving machine, a gear which has not had its teeth properly cut. In either case, the teeth of the gear will be crowded into the teeth of the shaving tool and the cutting lands or teeth of the shaving tool stripped off. Then the tool has to be scrapped.

Heretofore, the operator has had to align the teeth of the gear to be shaved with the tooth spaces of the shaving gear by eye. No apparatus has been provided for this purpose. Neither has any means been provided to insure that the teeth of the gear to be shaved have been cut to the proper depth and proper thickness before the gear is placed upon the shaving machine.

One object of the present invention is to provide a device that will enable an operator readily to align the teeth of one toothed member with the tooth spaces of another before they are brought into mesh.

A further object of the invention is to provide a device which will insure that the alignment has been made before the machine is started.

Another object of the invention is to provide a device which will test the gear to be shaved and insure that the tooth spaces of this gear have been cut to proper depth and width before the machine is started.

A still further object of the invention is to provide a device that will insure that the two toothed members are in correct meshing depth before the machine is started.

Other objects of the invention will be apparent hereinafter from the specification and from the recital of the appended claims.

In its preferred form, the device of the present invention is very simple and inexpensive. It comprises a notched collar or plate and a lever that carries two members which engage, respectively, with the collar and one of the two toothed members that are to be run together.

The notched collar or plate is secured to the arbor or spindle that carries one of the toothed members, for instance the shaving tool. It is provided with as many notches as there are teeth in the shaving tool. When a shaving tool is first placed on the machine the tooth spaces of the tool are aligned with the notches of this collar or plate and then the tool is rigidly clamped to the arbor and spindle. Thus the tooth spaces of the tool are always aligned with notches of the plate as long as the tool is in use.

The lever is pivotally mounted at a convenient point upon the machine. It carries a pin and a dog. The pin is adapted to be engaged with a tooth space of the gear to be shaved and the dog is adapted to engage in a notch of the collar or plate. The dog is so mounted on the lever that when it is fully engaged with a notch of the collar or plate and the pin is fully engaged with a tooth space of the gear to be shaved, the tooth space of the gear will be aligned with a tooth of the shaving tool.

The dog has a wedge-shaped nose and the notches of the plate or collar have converging entering sides so that when the dog is brought into engagement with a notch of the collar, if the two do not precisely register, the dog will rotate the collar and with it the tool spindle, as the dog is moved further on into engagement with the notch of the collar, and will cause the collar to be rotated to align the teeth of the gear precisely with the tooth spaces of the tool.

To insure that the tooth spaces of the gear have been cut to proper depth and width, a limit switch may be provided in the starting circuit of the machine which must be closed before the machine can be started. Means may be provided to trip this switch from the movement of the lever arm so that unless the arm is moved far enough to move the pin into a given depth in a tooth slot of the gear, the switch will not be closed. By making the pin of proper diameter, therefore, assurance can be had not only that the tooth spaces of the gear are properly aligned with the teeth of the tool but that the tooth spaces of the gear have been cut to proper width and depth.

To further safeguard the tool, a second limit switch may be incorporated in the starting circuit of the machine to insure that the gear and tool are actually in mesh before the machine is started. This limit switch is preferably mounted so that it will not be closed until the support that carries the gear has been moved to a predetermined position where the gear will be meshed with the tool at a predetermined depth.

While the device of the invention is particularly designed for use on machines for shaving gears, it may be employed with advantage, also, on other forms of machines where a pair of toothed members are run together. Thus, the invention can be used to advantage on gear testing machines, gear lapping machines, gear burnishing machines, etc., to insure that the tooth spaces of one gear are aligned with the teeth of the other and in proper mesh before the machine is started.

A preferred embodiment of the invention is illustrated in the accompanying drawings, in which:

Fig. 3 is a fragmentary plan view of the machine without the tooth aligning device, illustrating particularly the operation of the mechanism for insuring that the gear and shaving tool are meshed to proper depth before the machine is started;

Fig. 4 is a fragmentary view on an enlarged scale showing the dog and the cooperating plate or collar, with the dog about to enter a notch thereof;

Fig. 5 is a bottom plane view of the parts illustrated in Fig. 4, but showing the dog partially in engagement with the notch of the collar;

Fig. 6 is an elevational view of the dog; and

Figure 1:
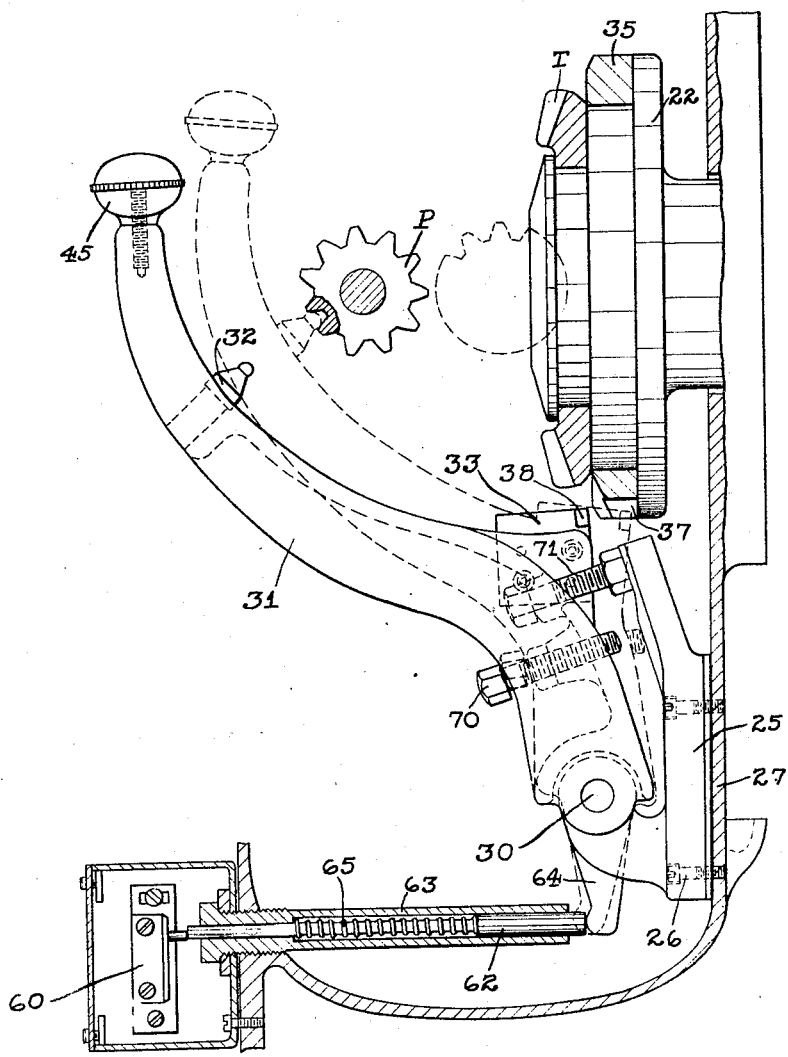
Fig. 1 is a side elevation of a tooth aligning device constructed according to the present invention illustrating how the device operates when mounted upon a shaving machine of standard construction.

As already stated, the invention may be employed in connection with any standard machine used for the shaving of gears. In the drawings, the invention has been illustrated in connection with a device for aligning the teeth of a spiral bevel pinion with the tooth spaces of a spiral bevel shaving gear and the machine employed here may be a machine of the type described in the United States patent to Slade, No. 1,796,484 of March 17, 1931. 10 denotes the base or frame of this machine. 11 is the pinion head of this machine which is mounted to slide upon ways 12 that are integral with the base 10.

Figure 2:
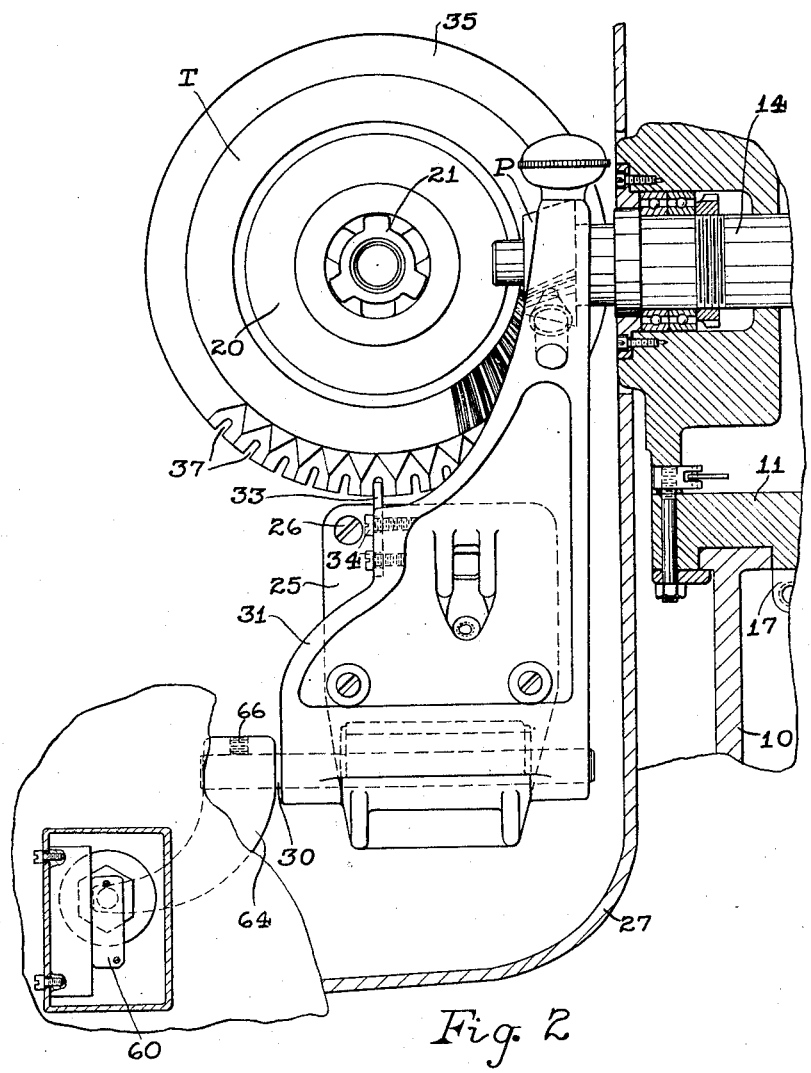
Fig. 2 is a partial front elevation and partial sectional view of the parts shown in Fig. 1.

The pinion P to be shaved is secured in any suitable manner to the drive-spindle 14 which is suitably journaled on anti-friction bearings in the head 11. The head 11 is adjustable on the base 10 by operation of the hand wheel 15 and screw shaft 16. The latter is journaled in the base 10 and threads into the cut 17 (Fig. 2) that is secured to the head 11.

The shaving tool denoted at T is secured in any suitable manner, as by means of the clamping disc 20 and head 21 to the arbor 22. This arbor is mounted in the driven spindle of the machine.

The tooth aligning device is mounted upon a bracket 25 that is secured by screws 26 to the gear head of the machine or to a guard 27 which is secured to that head.

Pivotally mounted upon the bracket 25, as by means of the pin 30, is a lever 31 which is so secured to the pin that the two rock together. There is a ball-headed pin 32 threaded into a hole in this lever and at one side of the lever there is secured a dog 33 by means of screws 34.

Secured to the gear arbor 22 in any suitable manner to be coaxial with the gear spindle is a collar or plate 35. This plate is provided with as many peripheral grooves or notches 37 as there are tooth spaces in the shaving gear T and the grooves or notches are spaced uniformly apart.

The dog 33 has a nose-portion 38 which is adapted to engage in the notches 37 of the plate 35. This nose-portion 38 has its opposite sides milled off so that it is of wedge or V-shape in cross section. The entering ends of the slots 37 are considerably wider than the nose-portion 38 of the dog 33. They have sides 40 which converge rearwardly and connect with parallel walls 42.

In the use of the apparatus, the collar or plate 35 is secured to the gear arbor 22 and then the shaving tool T is mounted on the abor and its tooth spaces aligned with the grooves or notches in the collar or plate 35. This can be done by eye or a suitable gage may be provided for the purpose. Then the tool is clamped to the arbor. This alignment of the shaving tool and plate does not need to be done again until a new tool is put on the machine.

The pinion to be shaved is secured to the drive spindle 14 while the drive head is in operative or loading position indicated in dotted lines in Fig. 3. The operator now grasps the knob 45 which is secured to the lever 31 and swings the lever upwardly to engage the ball-head of the pin 32 in a tooth slot of the pinion P. It may be necessary to rotate the pinion spindle slightly to bring a tooth slot of the pinion into registry with the pin, but this can be done readily by hand. If a tooth space of the tool is aligned with a tooth space of the pinion, the dog 33 will enter a notch 37 of the plate 35 at the same time that the pin 32 enters a tooth space of the pinion P. If the teeth of the tool T and the tooth spaces of the pinion P are not in registry, then as the dog 38 moves into engaging position, one of the sides of the wedge shaped nose 38 will engage with one of the inclined sides 41 of a slot 37 of the plate 35 and sliding along the surface 41 will cause the plate 35 to revolve until the nose 38 registers with and enters between the sides 42 of this slot 37. Thus in the act of fully engaging the dog with a slot of the plate, the tool will be rotated far enough to bring its teeth into alignment with the tooth spaces of the pinion.

As a further safeguard, it is desirable to assure that the pinion is meshed with the tool at proper running depth before the machine is started. If the pinion goes into proper depth mesh with the gear, then there is no reason why the two will not run together properly when the machine is in operation.

Provision has been made in a very simple way with the present invention to insure that gear and tool are fully meshed before the machine can be started. A limit switch 50 (Fig. 3) of any suitable construction is secured to the base of the machine and a trip member is mounted upon the drive head 11 in position to engage and trip this limit switch when the drive head has been moved far enough to bring the pinion into correct meshing position.

Figure 7:
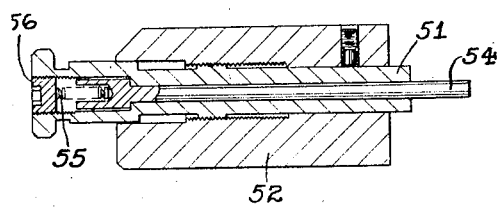
Fig. 7 is a longitudinal sectional view of the adjustable stop which is adapted to trip the limit switch which is incorporated in the starting circuit of the machine and which controls the depth of engagement of the gear and shaving tool.

The trip member comprises a sleeve 51 that is adjustably threaded into the bore of a lug 52 (Figs. 3 and 7) that is secured to the head 11. There is a plunger 54 slidably mounted in the bore of the sleeve 51. This plunger is spring-pressed rearwardly by a coil spring 55 which is interposed between the forward end of the plunger and a nut 56. The nut 56 threads into an enlarged opening formed in the knob-shaped forward end of the sleeve 51.

When the drive head 11 is moved rearwardly, the plunger 54 will be brought into engagement with and will trip the limit-switch 50. The spring 55 is provided to prevent breakage of the parts at the end of the movement. The limit switch is incorporated in the starting circuit of the drive motor of the machine so that the machine cannot be started until the limit switch is closed. Thus, until the drive head has been moved into position to mesh the pinion P with the shaving gear T at proper depth position, the machine cannot be started. The sleeve 51 can be adjusted in the arm 52 for different sizes of pinions to determine the position at which the limit switch 50 will be tripped and closed so that the point at which the switch will be tripped can be controlled very accurately to insure that the pinion is moved into the correct meshing depth for a given job.

In some cases, it may be desirable, as already stated, to provide in addition to these features, a safety device which will insure that the machine will not be started unless the pinion to be shaved has already had its tooth spaces cut sufficiently close to finished depth and width that the shaving tool will only have to remove the final few thousandths of an inch of stock that it is intended to remove in the shaving operation. This purpose can be achieved very readily by making the ball-head of the pin 32 of a diameter to act as a gage of the width and depth of the pinion tooth spaces when it enters a tooth space of the pinion and by providing an electrical trip mechanism to cooperate with the lever 31 to insure that the lever is moved far enough to move the ball into proper depthwise engagement with the pinion before the machine is started. For this purpose, a limit switch of standard construction, such as denoted at 60 may be mounted upon a guard or the frame of the machine. This limit-switch may be used to control a mechanically locked relay which like the limit switch 50 is incorporated in the starting circuit of the machine. Unless the relay is closed the machine cannot be started.

The limit switch 60 may be tripped by a plunger 62 which is mounted in a sleeve 63 that threads into the guard 27. This plunger engages the end of an arm 64 which is secured to the pin 30 by a set screw 66. It is held resiliently in engagement with this arm by the coil spring 65 which is interposed between a shoulder formed on the plunger and a shoulder formed in the bore of the sleeve 63. Thus as the lever 31 is rocked inwardly to move the pin 32 into engaging position, the arm 64 is rocked outwardly to push the plunger 62 outwardly and trip the switch 60.

Where the limit switch 60 is used, a stop must be provided to limit precisely the withdrawal movement of the drive head 11, so that gauging of a pinion may always take place with the head in the same position. This stop may take the form of an adjustable screw 68 which threads into the base 10 and which is adapted to engage a lug 69 on the head 11. A micrometer dial may be provided, if desired, to adjust the screw precisely.

The operation of the apparatus will be understood from the preceding description. The operator places the pinion on the drive spindle 14 with the head 11 in withdrawn position. Then he swings the arm 31 upwardly to bring the pin 32 into one of the tooth spaces of the pinion. When the pin goes into proper depth, the plunger 62 will be moved far enough to close the switch 60 and close the relay operated thereby. At the same time the dog 33 will engage in a notch of the plate 35 and align the teeth of the shaving gear T with tooth spaces of the pinion. Then the operator can move the head 11 on into operative position by rotating the handwheel 15. When the head has reached operative position, the plunger 54 will trip the limit switch 50 completing the starting circuit of the machine. The operator can now start the machine to rotate the pinion in engagement with the shaving tool and effect the shaving operation. When the operation is complete, the head 11 is withdrawn to the limit position determined by stop-screw 68 and the pinion is removed. Another pinion can then be chucked and aligned, as before.

The swinging of the lever 31 in opposite directions is limited by two adjustable stop screws 70 and 71. The screw 70 threads into the arm 31 and is adapted to abut against the bracket 25 to limit inward movement of the lever arm. The screw 71 is secured in the bracket 25 and is adapted to slide through a hole in the lever 31. Its head limits the outward movement of the lever.

While the invention has been described in connection with a machine for operating upon bevel gears, it will be understood that the invention may be employed on any type of machine where it is required to run one toothed member with another, whether they be bevel gears or spur gears or any other form of toothed members. In general, it may be said that the invention is capable of various modifications and uses and this application is intended to cover any variations, uses or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. In a machine for running two toothed members together, the combination with a pair of supports, one for each toothed member, and means for adjusting one of said supports relative to the other to move the toothed members into and out of engagement, of means for aligning the teeth of one member with the tooth spaces of the other after the toothed members have been mounted on their respective supports and while they are out of engagement.

2. In a machine for running two toothed members together, a pair of supports, one for each toothed member, means for adjusting one of the supports to bring the two toothed members into mesh, and means operatively connected to one of said supports for preventing starting of the machine until the toothed members have been meshed to a predetermined depth.

3. In a machine for running two toothed members together, a pair of supports, one for each toothed member, means for adjusting one of said supports to move the toothed members into and out of engagement, means for aligning the teeth of one member with the tooth spaces of the other after they have been mounted on their respective supports and while they are out of engagement, and means operatively connected to the aligning means for preventing starting of the machine until this has been done.

4. In a machine for running two toothed members together, a pair of supports, one for each toothed member, means for gauging one of the members to insure that its tooth spaces are of predetermined width and depth, and means for preventing starting of the machine until this has been done.

5. In a machine for running two toothed members together, a pair of supports, one for each toothed member, means for adjusting one of said supports to move the toothed members into and out of engagement, means for aligning the teeth of one member with the tooth spaces of the other after the toothed members are mounted on their supports and while they are out of engagement, and means for simultaneously gauging one of said members to insure that its tooth spaces are of predetermined width and depth.

6. In a machine for running two toothed members together, a pair of supports, one for each toothed member, means for aligning the teeth of one member with the tooth spaces of the other, means for simultaneously gauging one of the members to insure that its tooth spaces are of predetermined width and depth, and means for preventing starting of the machine until this has been done.

7. In a machine for running two toothed members together, a pair of supports, one for each toothed member, means for aligning the teeth of one member with the tooth spaces of the other while the toothed members are out of engagement, means for adjusting one of the supports to bring the two toothed members into mesh, and means operatively connected to the movable support for preventing starting of the machine until the toothed members have been meshed to a predetermined depth.

8. In a machine for running two toothed members together, a pair of supports, one for each toothed member, means for aligning the teeth of one member with the tooth spaces of the other comprising a gauge adapted to enter a tooth space of one member, and means preventing starting of the machine unless said gauge goes into the tooth space to a predetermined depth.

9. In a machine for running two toothed members together, a pair of supports, one for each toothed member, means operable to engage a tooth space of one member after said toothed members have been mounted on their respective supports but while they are out of engagement, and means operatively connected to said first named means for rotating the other toothed member to align a tooth of the latter member with a tooth space of the first member if the tooth and tooth space are not already in registry.

10. In a machine for running two toothed members together, a pair of supports, one for each toothed member, means movable to engage a tooth space of one member after said toothed members have been mounted on their respective supports and while they are out of engagement, and means operable simultaneously therewith to rotate the other member to align a tooth of the latter member with a tooth space of the first if the tooth and tooth space are not already in registry.

11. In a machine for running two toothed members together, a pair of supports, one for each toothed member, a movable member, means carried by said movable member adapted to engage a tooth space of one toothed member and separate means carried by said movable member for rotating the other toothed member, upon movement of the movable member into operative position, to align a tooth of said second toothed member with a tooth space of the first toothed member if the tooth and tooth space are not already in registry.

12. In a machine for running two toothed members together, a pair of supports, one for each toothed member, a notched plate mounted coaxially with one of said supports and having as many notches as there are teeth in the toothed member which is mounted on said support, a movable lever, a pin carried by said lever adapted to be moved into engagement with a tooth space of the second toothed member, and a dog also carried by said lever adapted to engage a notch of said plate upon movement of the pin into engaging position, to align a tooth of the second member with a tooth space of the first member if they are not already in alignment.

13. In a machine for running two toothed members together, a pair of supports, one for each toothed member, a notched plate mounted coaxially with one of said supports and having a plurality of notches which have converging sides at one end, the number of said notches being equal to the number of teeth in the toothed member mounted on said support, a movable lever, a pin carried by said lever adapted to be moved into engagement with a tooth space of the other toothed member, and a dog also carried by said lever adapted to engage a notch of said plate, upon movement of the pin into engaging position, said dog having a V-shaped nose to enter the converging sides of the slots of said plate and rotate said plate to align a tooth of the first member with a tooth space of the second member, if the tooth and tooth space are not already in alignment.

14. In a machine for running two toothed members together, a pair of supports, one for each toothed member, a notched plate mounted coaxially with one of said supports and having a plurality of notches with converging sides at one end, said notches being equal in number to the number of teeth in the toothed member which is mounted on said support, a movable lever, a pin carried by said lever adapted to be moved into engagement with a tooth space of the other toothed member, a dog also carried by said lever adapted to engage a notch of said plate, upon movement of the pin into engaging position, said dog having a generally V-shaped nose to enter between the converging sides of the slots of said plate and rotate said plate to align a tooth of the first member with a tooth space of the second member if the tooth and tooth space are not already in alignment, said pin having a predetermined diameter whereby it acts also as a gauge of the width and depth of the tooth spaces of the second member, and means preventing starting of the machine unless the pin enters a tooth space of the second member to a predetermined depth.

15. In a machine for running two toothed members together, a pair of supports, one for each toothed member, means movable to engage a tooth space of one member, means operated, on movement of the first named means to engageing position, for rotating the other toothed member to align a tooth of the second toothed member with a tooth space of the first toothed member if the tooth and tooth space are not already in registry, and means for preventing starting of the machine until the first named means has been engaged to a predetermined depth with its toothed member.

OLIVER F. BAUER.